US009181903B2

(12) United States Patent
Caine

(10) Patent No.: US 9,181,903 B2
(45) Date of Patent: Nov. 10, 2015

(54) METHOD AND APPARATUS FOR INJECTING OXYGEN WITHIN AN ENGINE

(71) Applicant: Ford Global Technologies, LLC, Dearborn, MI (US)

(72) Inventor: Jonathan Edward Caine, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 13/851,000

(22) Filed: Mar. 26, 2013

(65) Prior Publication Data
US 2013/0247884 A1  Sep. 26, 2013

(30) Foreign Application Priority Data

Mar. 26, 2012 (GB) .................................. 1205223.9

(51) Int. Cl.
*F02M 25/07* (2006.01)
*F02B 37/20* (2006.01)
(52) U.S. Cl.
CPC ................ *F02M 25/07* (2013.01); *F02B 37/20* (2013.01); *F02M 25/0707* (2013.01); *F02M 25/0742* (2013.01); *Y02T 10/121* (2013.01); *Y02T 10/144* (2013.01)
(58) Field of Classification Search
CPC ........................ F02M 25/0707; F01N 2610/04
USPC .......... 123/568.12, 585, 25 A, 568.29, 559.1; 60/272–324
See application file for complete search history.

(56) References Cited

U.S. PATENT DOCUMENTS

| 3,807,373 A | * | 4/1974 | Chen .............................. 123/434 |
| 3,861,367 A | * | 1/1975 | Kelmar ......................... 123/567 |
| 4,064,840 A | * | 12/1977 | Vierling ............................ 123/3 |
| 4,960,098 A | * | 10/1990 | Akerib .......................... 123/699 |
| H1466 H | * | 8/1995 | Stapf .............................. 123/585 |
| 7,661,416 B2 | * | 2/2010 | Sasajima et al. .......... 123/568.12 |
| 8,065,991 B2 | * | 11/2011 | Kuroki et al. ............ 123/568.12 |
| 2006/0053777 A1 | * | 3/2006 | Bruckmann ..................... 60/286 |

FOREIGN PATENT DOCUMENTS

| CN | 101503983 A | 8/2009 | |
| JP | 63195359 A | * 8/1988 | ............. F02D 45/00 |
| JP | 2000130178 A | 5/2000 | |

(Continued)

OTHER PUBLICATIONS

Caine, Jonathan Edward, "Method and Apparatus for Injecting Hydrogen Within an Engine," U.S. Appl. No. 13/851,005, filed Mar. 26, 2013, 23 pages.

*Primary Examiner* — Stephen K Cronin
*Assistant Examiner* — Susan E Scharpf
(74) *Attorney, Agent, or Firm* — Julia Voutyras; Alleman Hall McCoy Russell & Tuttle LLP

(57) ABSTRACT

An engine system comprising an accelerator device which is operable to increase the amount of fuel delivered to the engine for combustion; an exhaust gas recirculation system for removing exhaust gas from the engine and recirculating a portion of the exhaust gas to the engine; and an oxygen delivery apparatus adapted to deliver oxygen to the engine in response to operation of the accelerator device. Using this system, performance losses from EGR can be abated by introducing compensatory oxygen.

19 Claims, 14 Drawing Sheets

(56) References Cited

FOREIGN PATENT DOCUMENTS

| | | | |
|---|---|---|---|
| JP | 2006037745 A | 2/2006 |
| JP | 2007285281 A | 11/2007 |
| JP | 2009180220 A | 8/2009 |
| WO | 2010076967 A2 | 7/2010 |

* cited by examiner

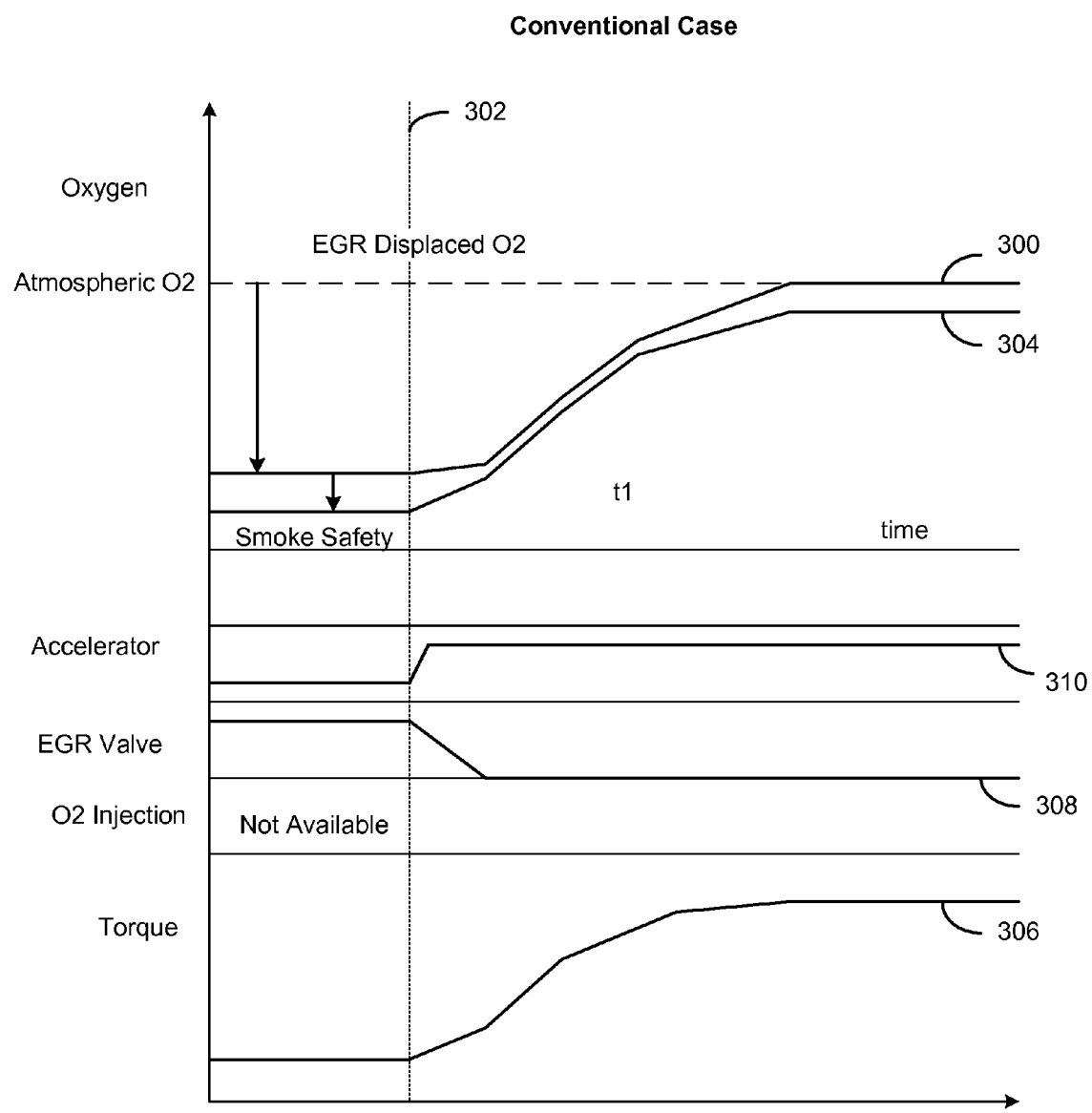

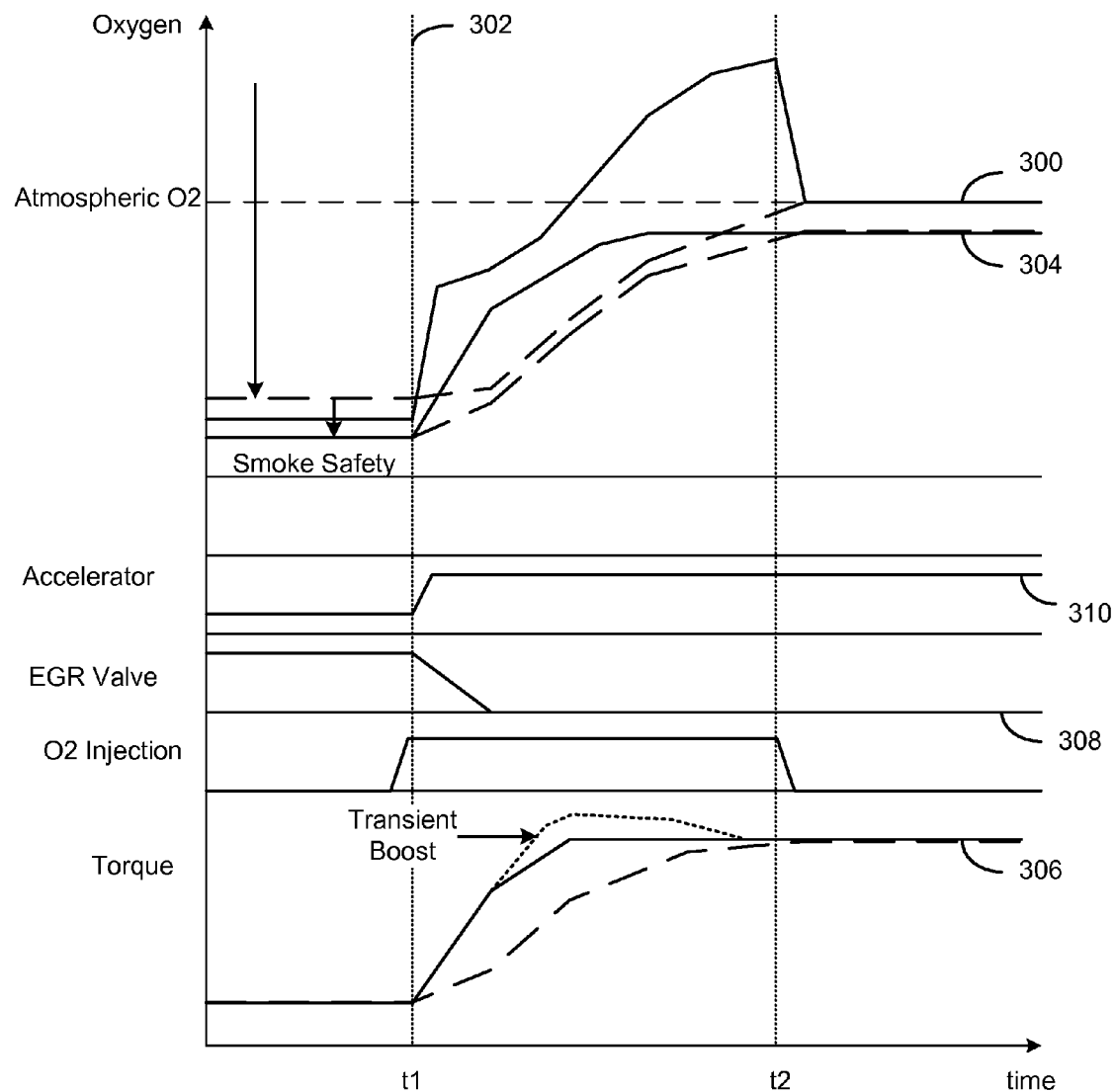

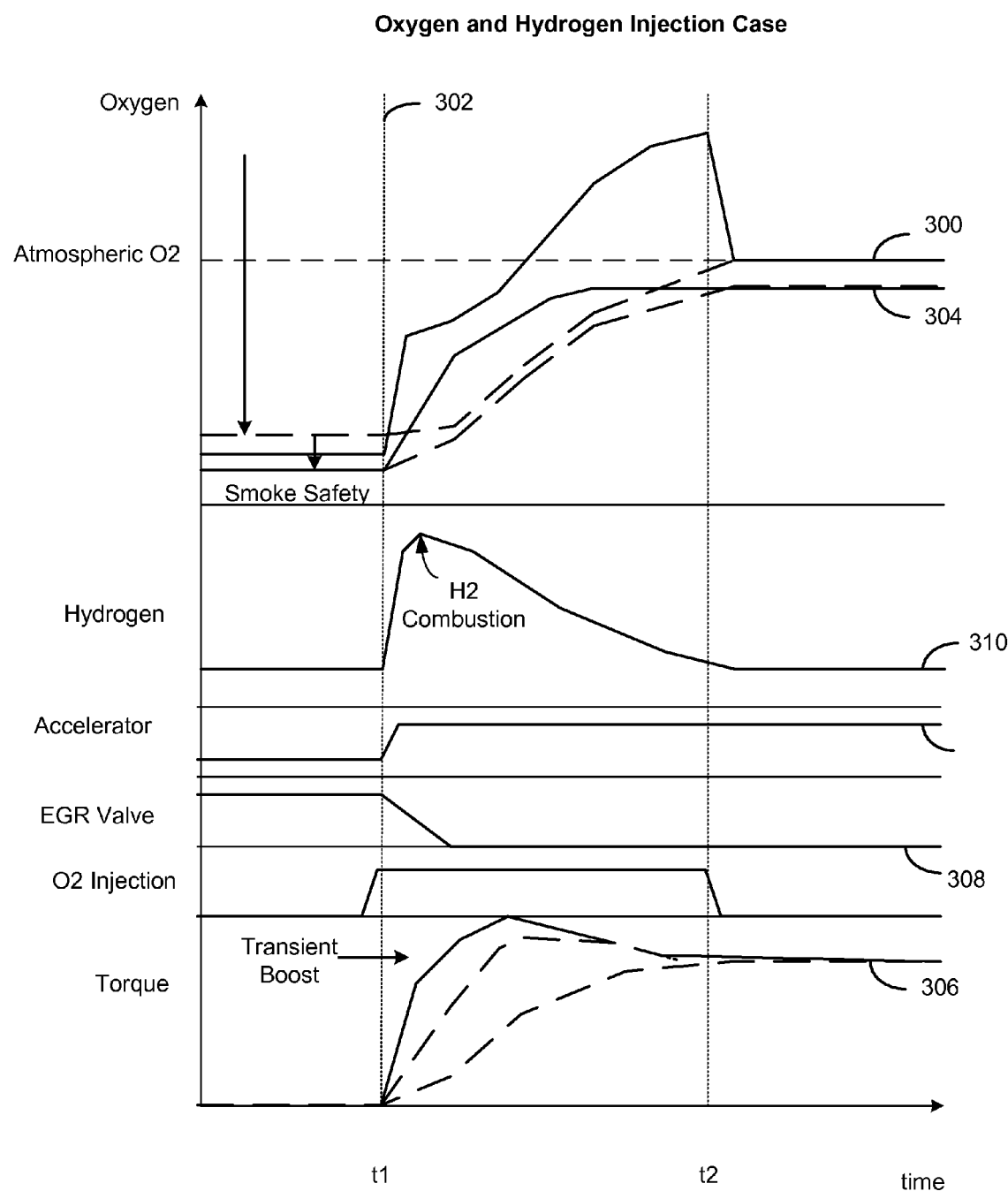

METHOD AND APPARATUS FOR INJECTING OXYGEN WITHIN AN ENGINE

CROSS REFERENCE TO RELATED APPLICATIONS

The present application claims priority to United Kingdom Patent Application No. 1205223.9, filed on Mar. 26, 2012, the entire contents of which are hereby incorporated by reference for all purposes.

BACKGROUND AND SUMMARY

The present invention relates to a method and apparatus for injecting oxygen within an engine. In particular, but not exclusively, the invention relates to injecting oxygen within an engine of a vehicle to allow a greater use of exhaust gas recirculation within the engine.

Exhaust gas recirculation (EGR) is used to reduce the amount of nitrogen oxide (NOx) emissions from petrol and diesel combustions by recirculating a portion of exhaust gas back into the engine cylinders for combustion. NOx forms primarily when a mixture of nitrogen and oxygen is subjected to a high temperature. By displacing an amount of oxygen and combustible materials in the cylinder via EGR, the temperature of combustion can be reduced resulting in lower emissions.

Most modern engines now require exhaust gas recirculation to meet emissions standards. In a typical automotive engine, between 5 to 15 percent of the exhaust gas is typically recirculated back to the air intake. At this level, however, EGR can result in losses in engine performance. For example, EGR measurably slows combustion and excessive EGR can cause high smoke emissions and misfires.

EGR losses are most apparent during specific operating conditions. For example, during steady state conditions, the EGR flow rate is limited to allow sufficient air for fuelling in the event that the driver operates the accelerator pedal. Thus, though higher amounts of EGR could maintain stable operation at steady state, it would not allow for sufficient combustion efficiency to achieve acceleration. Further, in high loads EGR may reduce peak power output. EGR is also conventionally not used at idle speed because it may contribute to unstable combustion.

The inventors found that by introducing oxygen into the EGR system in response to the actuation of an accelerator device, EGR can be maintained at higher levels and the lack of oxygen for combustion may be compensated. Thus efficiency losses from EGR during acceleration may be reduced or eliminated.

In a turbocharged engine, a turbocharger may include a compressor to compress air intake from the atmosphere or an exhaust gas recirculation system, to be delivered to the engine for combustion. By increasing the mass of air entering the engine, the expansive power of combusted energy is increased resulting in increased available torque and thus power and efficiency.

A compressor may be coupled to a high speed turbine within the exhaust system. A turbine may convert the kinetic energy and the potential energy from pressure into work that may be delivered to the compressor to provide power.

Boost from a turbocharger may be responsive to operating conditions and may be initiated to achieve acceleration. The initiation of turbocharge may be referred to as turbo boost. In systems that initiate turbo boost in response to throttle change, achieving boost requires first initiating the energy conversion capabilities of the turbine, accumulating of an amount of work, delivering accumulated work to the compressor, compressing intake aircharge, then delivering compressed air intake to the engine for combustion. The delay between throttle actuation and combustion of boosted aircharge to the engine is called turbo lag.

Turbo lag may be perceived by the operator as hesitation in the throttle response when accelerating from an idle speed. Turbo lag decreases the responsiveness of the vehicle to the operator and thus driving comfort and control.

The inventors found that by including a hydrogen delivery apparatus adapted to deliver hydrogen to the exhaust gas system such that the hydrogen can combust and expand, turbine speed may increase and turbo lag decrease. Further, by delivering hydrogen to the exhaust system upstream of the turbine where exhaust gas is relatively oxygen rich, the combustion of hydrogen may be assisted. The oxygen available for hydrogen combustion may be controlled or responsive to the activation of a turbo charger and may be provided by an oxygen delivery apparatus.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3A is a graph of various engine parameters over time.

FIG. 3B shows the same information for an engine using oxygen injection.

FIG. 3C shows the same information for an engine using oxygen and hydrogen injection.

DETAILED DESCRIPTION

Figure 1:
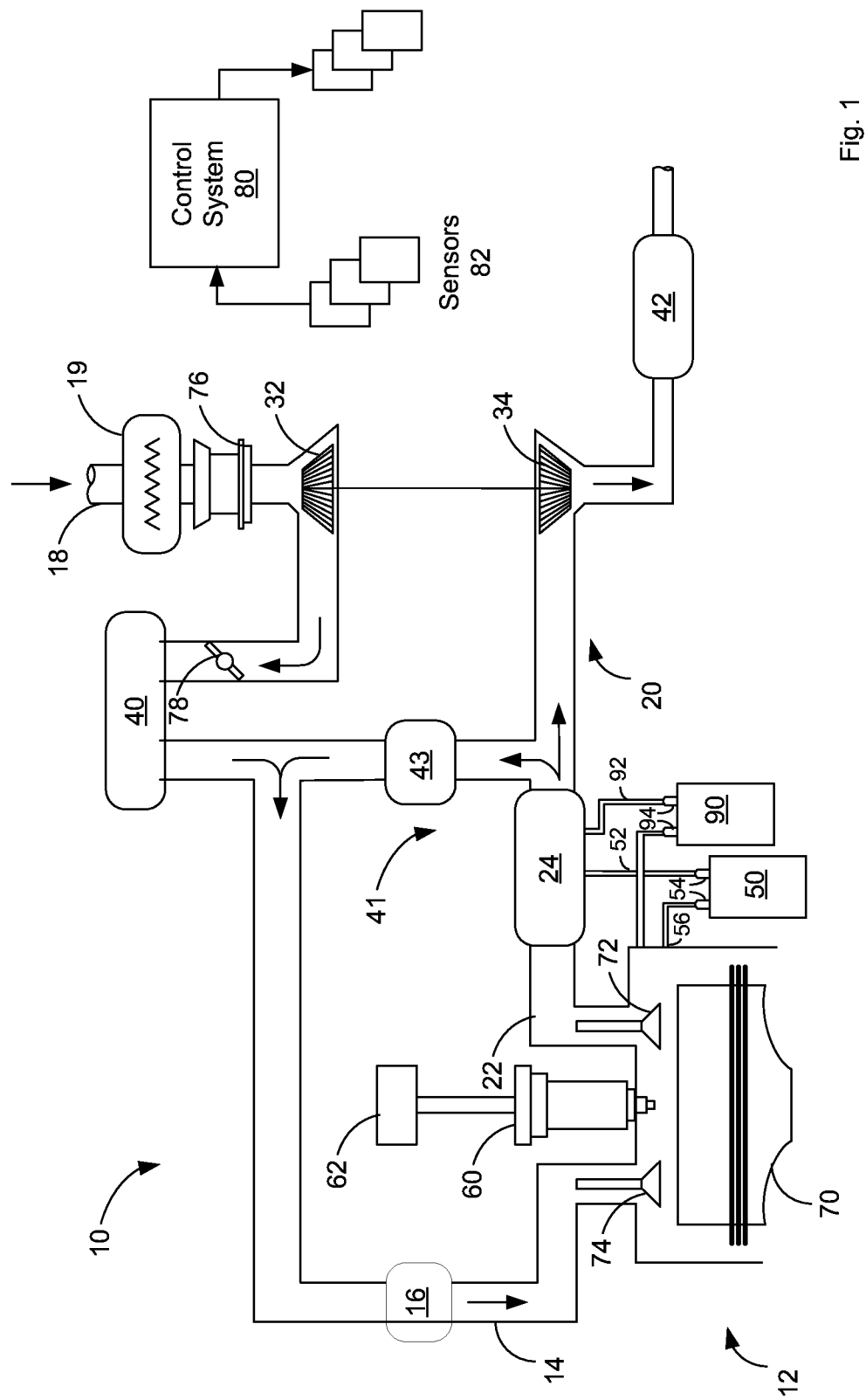
FIG. 1 is a schematic depiction of an embodiment of an engine system.

In an engine, such as that which may be included in the propulsion system of a vehicle, exhaust gas recirculation (EGR) is used to reduce the amount of nitrogen oxide (NOx) emissions from petrol and diesel combustions. In an EGR system, a portion of an engine's exhaust gas is recirculated back to the engine cylinders. For petrol engines, the inert exhaust gas displaces an amount of combustible matter in the cylinder. For diesel engines, the exhaust gas replaces some of the excess oxygen in the pre-combustion mixture.

NOx forms primarily when a mixture of nitrogen and oxygen is subjected to a high temperature. Thus, the lower combustion chamber temperatures caused by EGR reduces the amount of NOx that the combustion generates.

In a typical automotive engine, between 5 to 15 percent of the exhaust gas is typically recirculated back to the air intake. However, EGR does measurably slow combustion and excessive EGR can cause high smoke emissions and misfires. The use of EGR therefore typically involves a compromise between efficiency and NOx emissions.

The use of EGR may be limited by its efficiency losses under some operating conditions. During steady state conditions, the EGR flow rate is limited so as to allow sufficient air for fuelling in the event that the driver operates the accelerator pedal. EGR is typically not used at high loads because it may reduce peak power output. EGR is also conventionally not used at idle speed because it may contribute to unstable combustion. During these conditions the AFR may be rich fuel until the EGR flow rate can be switched off and the exhaust gas purged from the manifold.

Engine losses from EGR may result from the low oxygen content within exhaust gas in comparison to ambient air. The amount of fuel burned in a single combustion and the resulting torque produced is limited by the amount of oxygen within a cylinder at the time of combustion for fuel oxidation. High levels of EGR within the cylinder may reduce the amount of oxygen within the cylinder and thus limit the torque that may be produced. Thus, an EGR level may be maintained to support a presiding torque demand, however if an operator attempts to accelerate the vehicle the amount of oxygen within the system may not be sufficient. An amount of time may elapse before the exhaust gas concentration within the intake may be lowered to a point that allows for sufficient oxygen from ambient air to be supplied to the cylinders for combustion to produce an increased amount of torque. This may be perceived by the driver as accelerator delay.

However, if too much fuel is applied too quickly the fuel cannot combust fully, does not deliver the desired power, and will result in high smoke emissions. The full load limit of diesel engines is called the smoke limit. This limits both the acceleration of the vehicle and the amount of EGR flowed, and there is a tradeoff between NOx emissions and initial acceleration. This issue is exacerbated for more advanced EGR strategies such as Low Pressure EGR as the exhaust gas is applied before the turbocharger compressor. It is desirable to provide an engine system which allows a greater use of EGR to reduce emissions.

By introducing oxygen into the EGR system in response to the actuation of an accelerator device, EGR can be maintained at higher levels and the lack of oxygen for combustion may be compensated.

This may be achieved by including an oxygen delivery apparatus to deliver oxygen to the cylinders in response to accelerator device actuation. An accelerator device may be operable to increase the amount of fuel delivered to the engine for combustion. An amount of oxygen delivered to the cylinders may be a function of a proportional accelerator pedal position (PP) signal as indicated by a PP sensor. It may also be a function of the level of EGR within the cylinders.

The oxygen delivery apparatus may be adapted to deliver oxygen to each engine cylinder, or the intake manifold that may be fluidically coupled to the engine's cylinders. The oxygen delivery apparatus may include a reservoir for storing oxygen and may store oxygen at a pressure greater than atmospheric pressure or greater than the turbo boost pressure.

The engine system may include control system for controlling operation of the oxygen delivery apparatus. The control system may control the recirculation of exhaust gas to the engine to reduce or terminate the recirculation of exhaust gas to the engine in response to operation of the accelerator device and a PP signal that may be responsive to a depression of the accelerator device. The term "depression" may be understood to mean substantially full pressing of the accelerator device, rather than partial pressing, by the driver. A pedal may be actuated to a first position a distance from the full actuation position and substantially full pressing may refer to actuating the pedal more than 25% of this first distance. The control system may also deliver oxygen to the engine in response to depression of the accelerator device so as to cause an overboost condition within the engine.

The control system may ramp down or terminate the recirculating of exhaust gas to the engine in response to actuation of the accelerator device. The control system may include an exhaust gas sensor for sensing the level of exhaust gas in the engine. The exhaust gas sensor may be adapted to sense the level of exhaust gas at the air intake of the engine and may reduce or terminate the delivery of oxygen to the engine in response to the sensed level of exhaust gas reaching a predetermined minimum threshold. Alternatively or additionally, the control system may include an oxygen sensor for sensing the level of oxygen at the air intake of the engine and may reduce or terminate the delivery of oxygen to the engine in response to the sensed level of oxygen reaching a predetermined maximum threshold.

The oxygen delivery apparatus may comprise a reformer device. The reformer device may reform an air-fuel mixture from the cylinders or intake to a number of products that may include oxygen and hydrogen gas.

In embodiments that include a turbocharger, an engine system may include a compressor for inducing air towards the engine and a turbine for powering the compressor that may be driven by the removed exhaust gas. Some embodiments may include a hydrogen delivery apparatus that delivers hydrogen to the removed exhaust gas such that the hydrogen can combust and expand, thereby increasing the speed of the turbine. This may be separate or combined with the oxygen delivery apparatus. The hydrogen delivery apparatus may deliver hydrogen to the exhaust gas at a location in which the temperature of the exhaust gas is at or above the autoignition temperature of the hydrogen. The control system may control operation of the hydrogen delivery apparatus and may initiate or increase the delivery of hydrogen to the engine in response to operation of the accelerator device or in response to depression of the accelerator device and PP signal.

Figure 2:
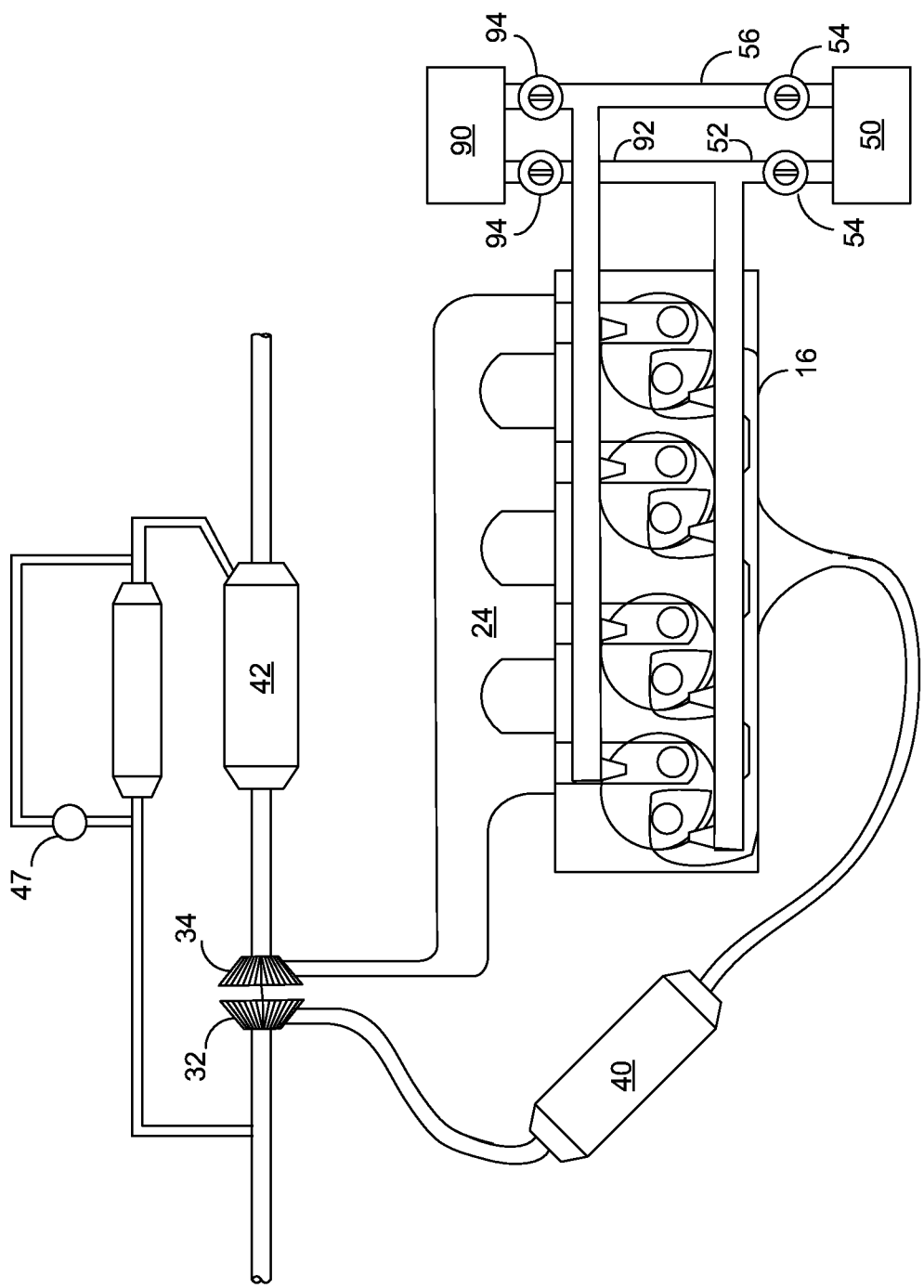
FIG. 2 is a plan view of a portion of the engine system of FIG. 1.
Figure 4:
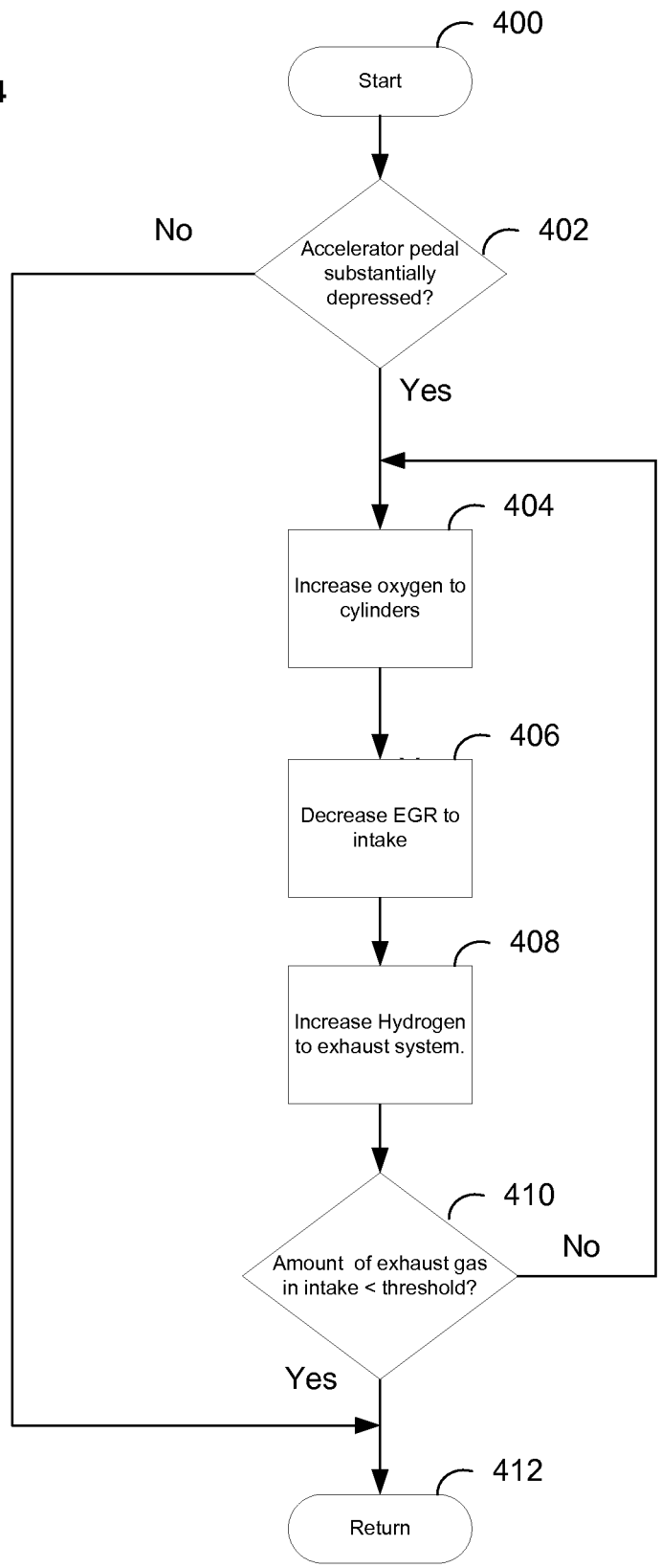
FIG. 4 shows an example operating method.
Figure 5:
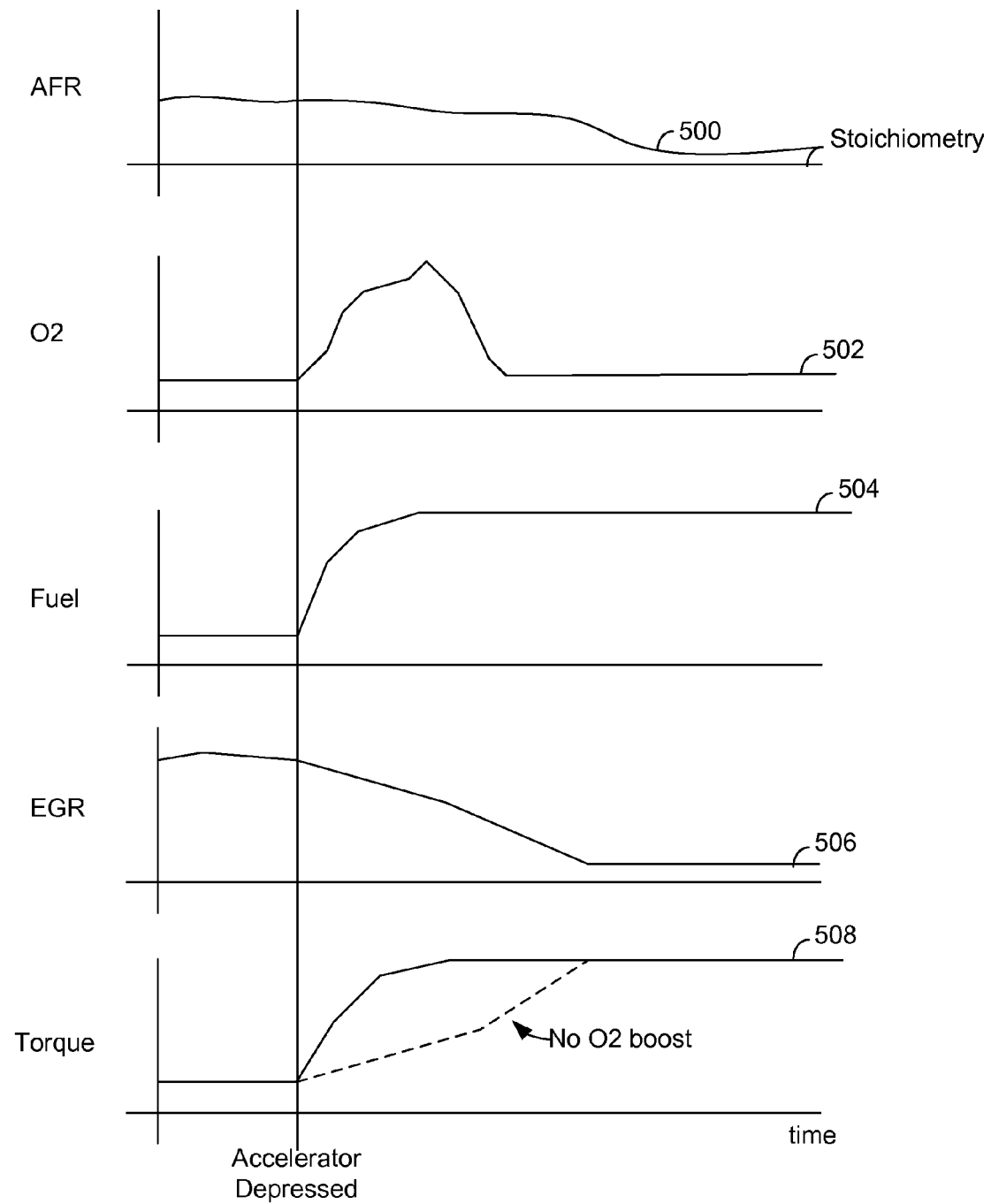
FIG. 5 shows example operating conditions for an embodiment using an example control routine.
Figure 6:
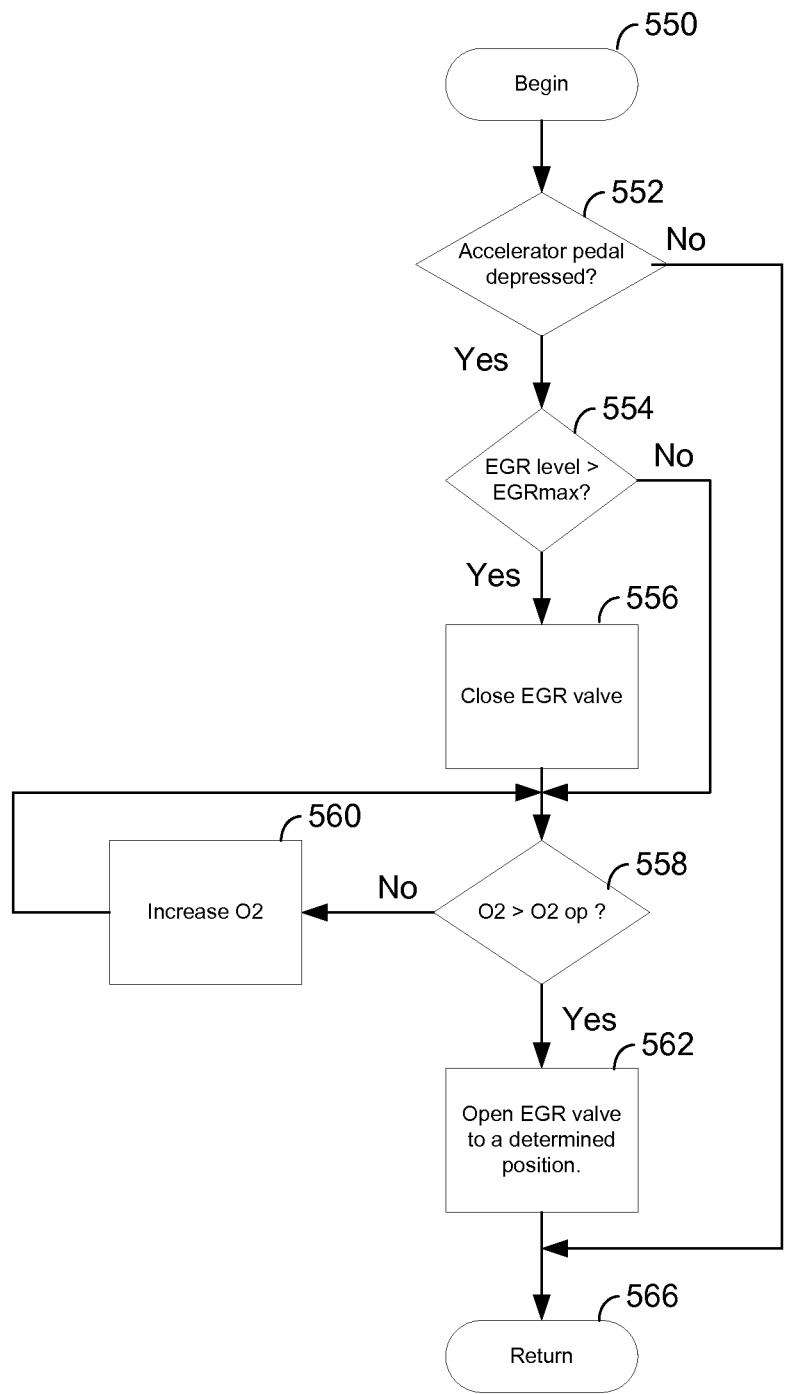
FIG. 6 shows an example operating method for the embodiment of FIG. 5.
Figure 7:
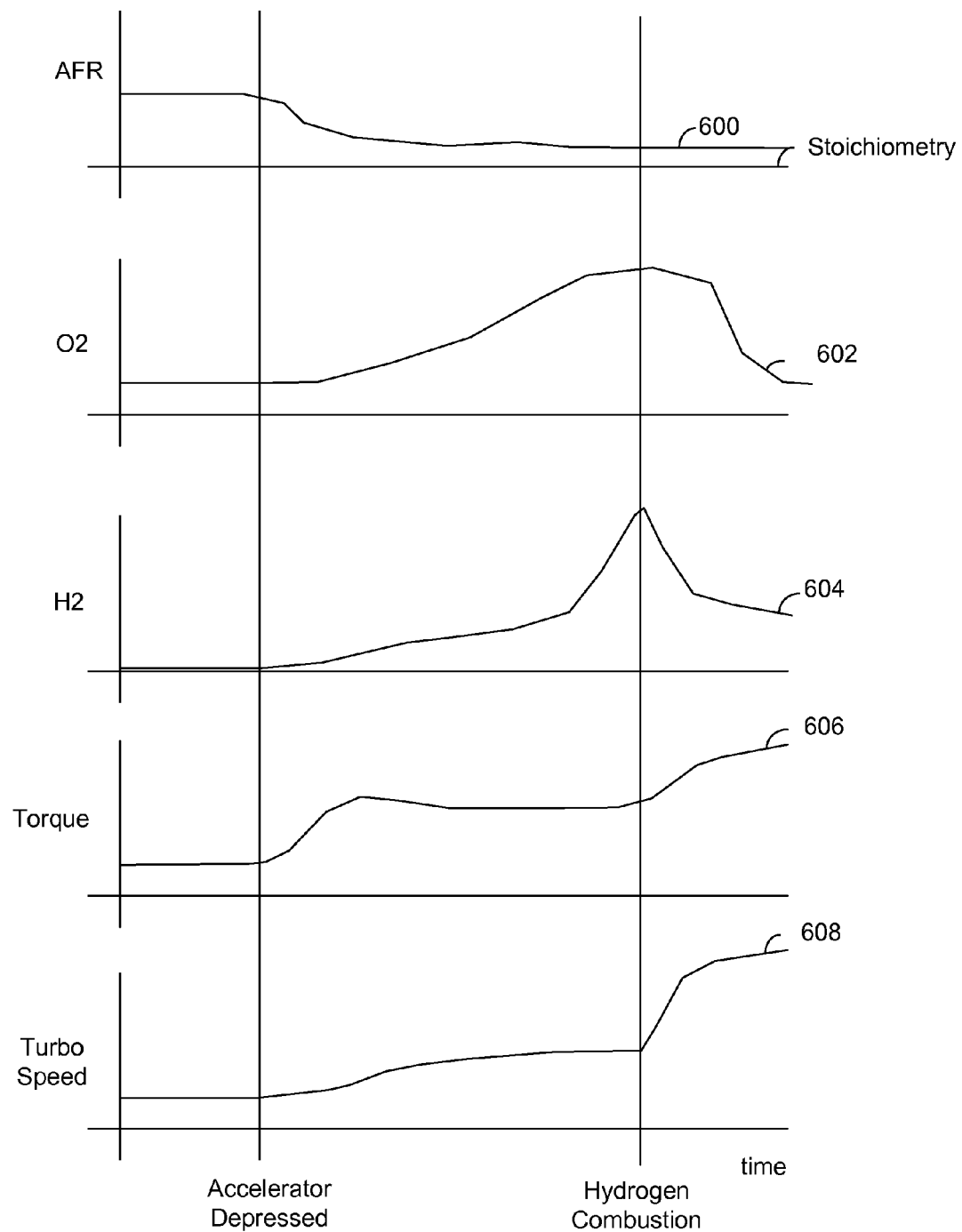
FIG. 7 shows example operating conditions for an embodiment using an alternate example control routine.
Figure 8:
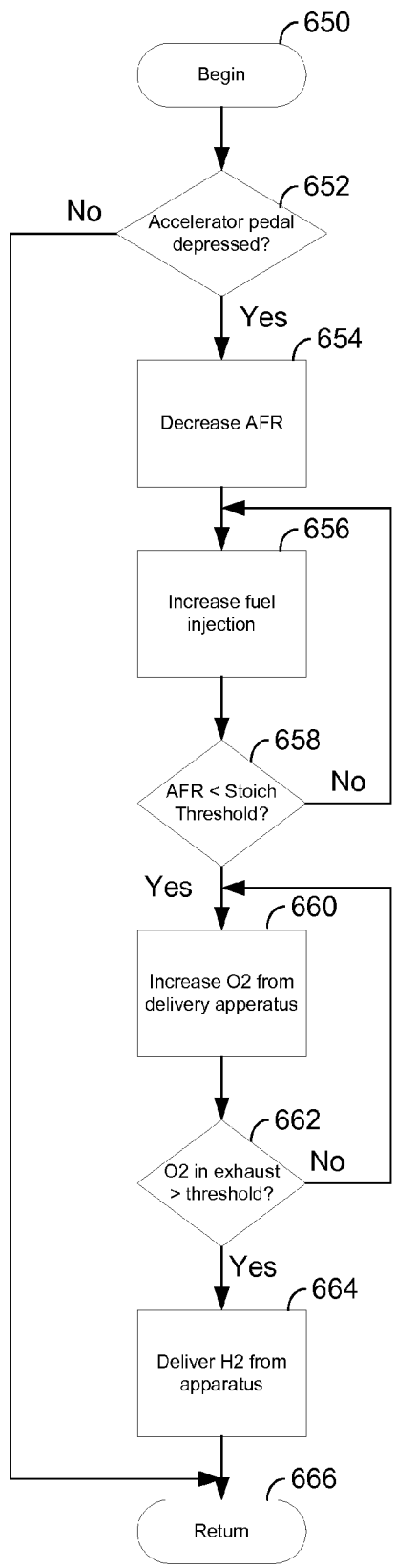
FIG. 8 shows an example operating method for the embodiment of FIG. 7.
Figure 9:
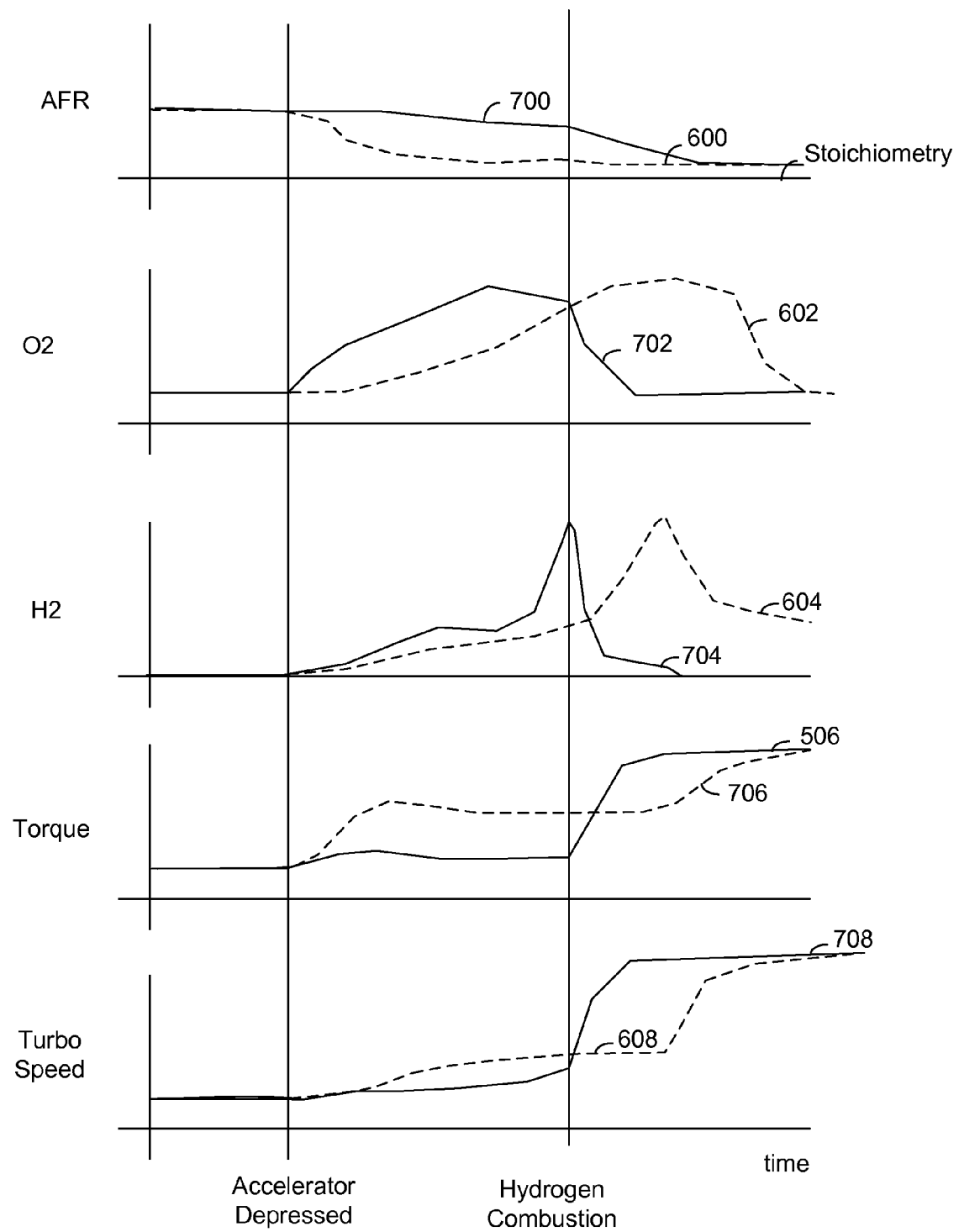
FIG. 9 shows example operating conditions for an embodiment using an alternate example control routine.
Figure 10:
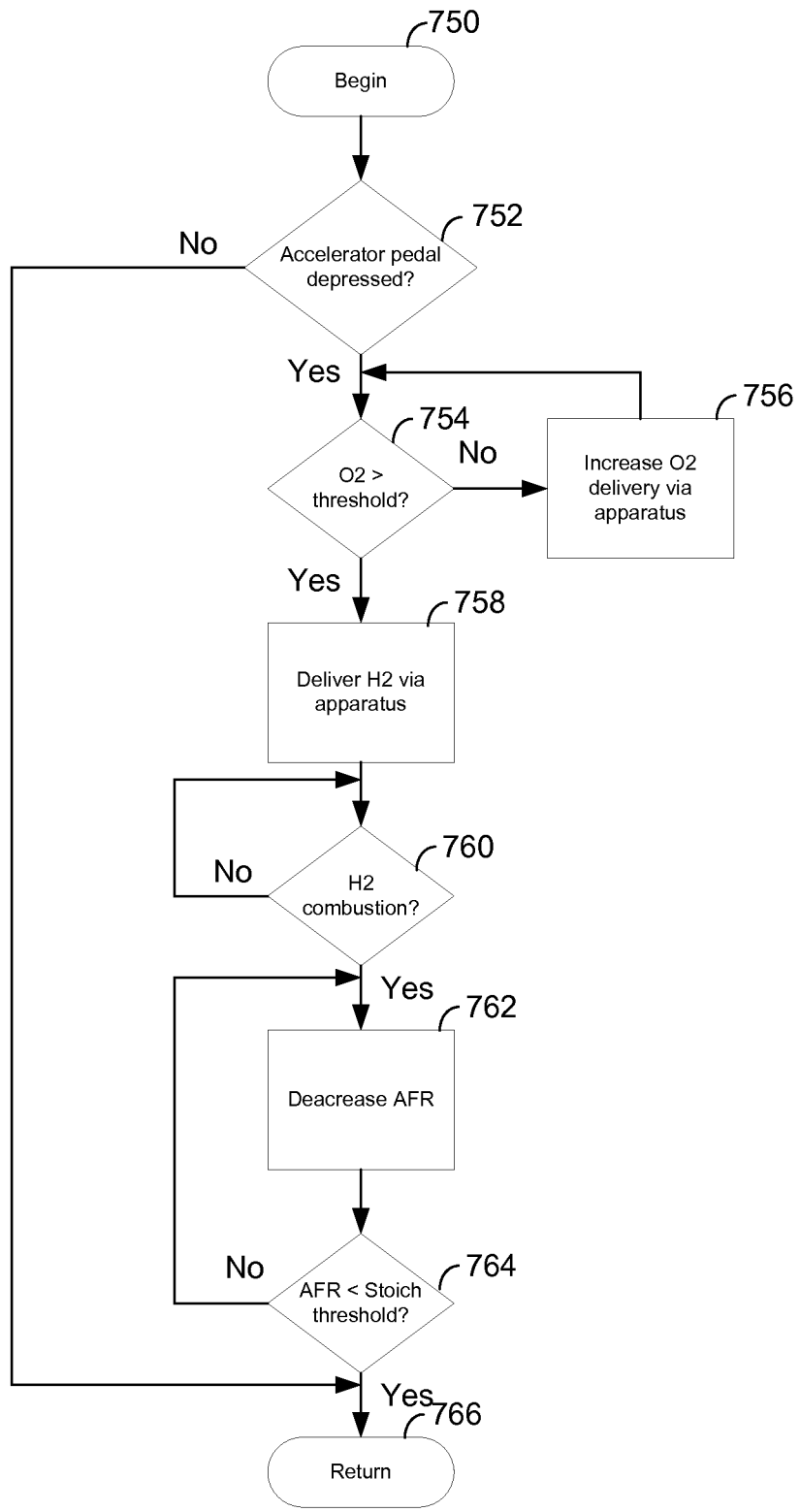
FIG. 10 shows an example operating method for the embodiment of FIG. 9.
Figure 11:
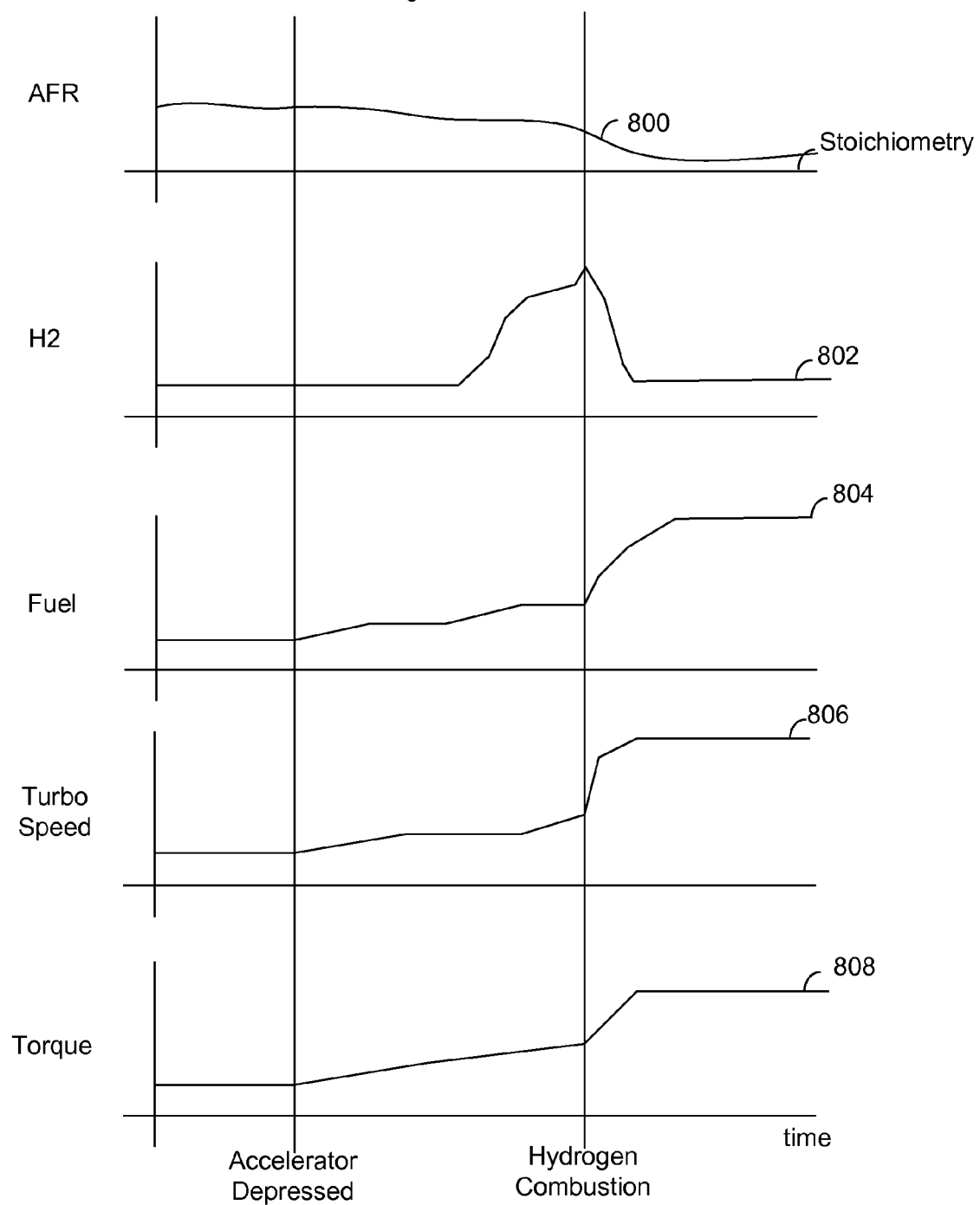
FIG. 11 shows example operating conditions for an embodiment using an alternate example control routine.
Figure 12:
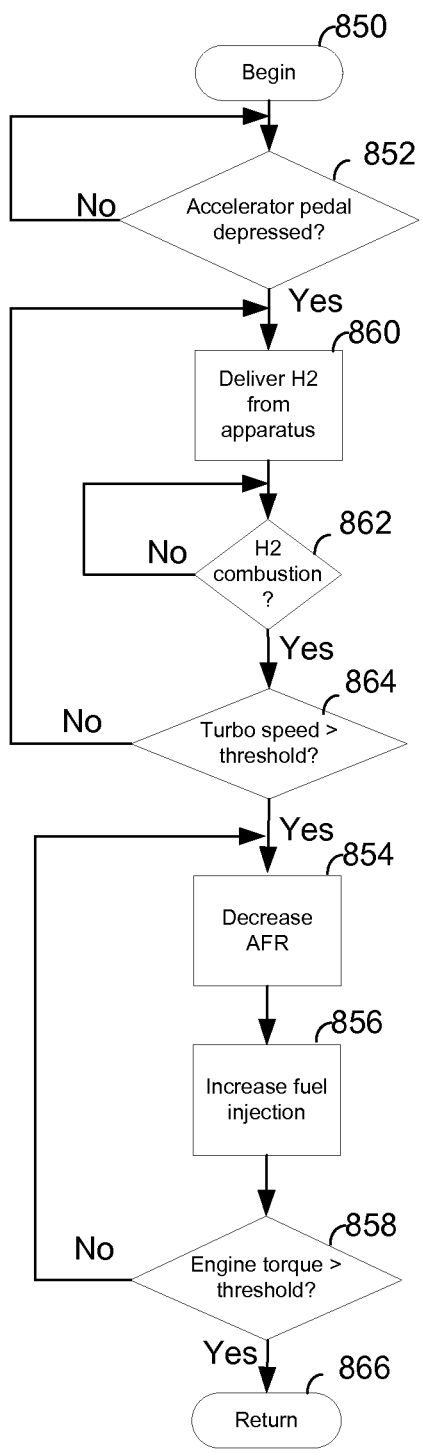
FIG. 12 shows an example operating method for the embodiment of FIG. 11.

FIG. 1 is a schematic view of an engine system compatible with an embodiment of the disclosed system. FIG. 2 is a plan view of a portion of the engine system of FIG. 1. FIG. 3A is a graph showing various engine parameters over time for an engine which uses EGR and FIG. 3B shows the same information for an engine using oxygen injection. FIG. 3C shows this information for an embodiment using EGR, oxygen injection and Hydrogen injection. FIG. 4 shows an example operating method of an engine with an oxygen delivery apparatus. FIG. 5 graphically represents the operating conditions of another example embodiment using oxygen injection. FIG. 6 shows an example control routine for an embodiment using an oxygen delivery apparatus. FIG. 7 graphically depicts several operating conditions of an engine system controlled by a routine such as that is depicted in FIG. 8, the system including an oxygen and a hydrogen delivery apparatus. FIG. 9 graphically depicts several operating conditions of an engine system with a hydrogen and oxygen delivery apparatus controlled by a routine such as that is depicted in FIG. 10. FIG. 11 graphically depicts several operating conditions of an engine system including a hydrogen delivery apparatus controlled by a routine such as that is depicted in FIG. 12, the hydrogen delivery apparatus operating independently of an oxygen delivery apparatus.

FIG. 1 shows one cylinder 12 of a multi-cylinder engine system 10 that may be included in the propulsion system of a vehicle. Though not shown, cylinder 12 may be part of an inline, V-shaped, or any configuration engine of any number of cylinders. Ambient air may enter the engine system via an air inlet 18. Low pressure throttle 76 may be actuated by control system 80 via actuators 84. Throttle 76 may be controlled by control system 80 via an input device actuated by a vehicle operator. The input device may include an accelerator pedal and an accelerator pedal position sensor that generates a proportional pedal position (PP) signal to control throttle 76. Throttle 76 may also be responsive to EGR within the intake system or EGR properties, such as fuel content, within the exhaust system. Other conditions determinative of the position of throttle 76 may be communicated to control system 80 via sensors 82.

Inlet 18 may be coupled to an air filter 19. Aircharge may pass through an air filter 19 before travelling through the compressor 32 of a turbocharger where air may be compressed and induced towards the engine cylinder 12. Compressor 32 may be a centrifugal or radial compressor receiving power from mechanically coupled turbine 34 such that compressor 32 is actuated and compresses gas in response to the rotation of the blades of turbine 34. Compressor 32 may have blades rotating about an axis in the intake system so that aircharge passing through the compressor is accelerated radially about the blades' axis of rotation. By increasing the total velocity component of intake aircharge, the kinetic energy increases. Thus, within a closed volume system, the potential energy from intake aircharge pressure increases.

The compressed intake air may then passes through an optional intercooler 40 to reduce the temperature and volume of the air before reaching an intake manifold 16. A high pressure intake throttle 78 may be positioned upstream or downstream of the intercooler 40. Throttle 78 may be actuated by sensors 82 responsive to actuators 84 via communicatively coupled control system 80. Throttle 78 may meter the amount of compressed aircharge delivered to the intake manifold. A throttle (not shown) may also be present downstream of an EGR system and may meter an amount of compressed aircharge and exhaust gas delivered to the engine. Cylinder 12 may receive intake air from an intake passage 14 fluidically connected to the intake manifold 16. The intake system may include mass air flow sensor and manifold pressure sensor to respectively communicate MAF and MAP signals to control system 80.

During cylinder fill, an intake valve 74 may be actuated by control system 80 to allow aircharge to enter a combustion chamber for combustion. Fuel may be injected into the combustion chamber via fuel injector 60 in what is called a direct injection system. Fuel injector 60 may be mounted near the top of combustion chamber within cylinder 12. In alternate embodiments, fuel may be injected into the aircharge in the intake system upstream of the combustion chamber. Embodiments of the disclosed engine system 10 may include an accelerator device (not shown) operable by the driver to increase the amount of fuel delivered to the engine for combustion.

Aircharge within the cylinders may ignite via a spark or compression and combust. Energy from combustion may be transmitted to a crankshaft (not shown) via mechanically coupled piston 70. The reciprocating motion of the piston may be translated into the rotational motion within the crank shaft to power the wheels. After combustion from spark or compression ignition, cylinder 12 may expel gas created during combustion into an exhaust passage 22 via exhaust valve 72. The exhaust gas removed from the cylinder 12 passes via the exhaust passage 22 to an exhaust manifold 24. In a multi-cylinder engine, exhaust gas from cylinder 12 may combine with exhaust gas from other cylinders and combustions within exhaust manifold 24.

A portion of exhaust gas may be recirculated to the intake manifold 16 via an EGR system 41. One or more EGR coolers may be present within EGR system, such as cooler 43. EGR flow may be throttled by an EGR throttle (not shown) within the EGR system responsive to engine conditions or exhaust gas properties. The EGR system depicted couples the exhaust system upstream of turbine 34 to the intake system downstream of compressor 32; this is called a high pressure EGR system. Other low pressure EGR systems may couple the exhaust system downstream of turbine 34 to the intake system upstream or downstream of compressor 32. Further embodiments may include both a high pressure and a low pressure EGR system.

An EGR system may include a number of valves and bypasses communicatively coupled to the control system 80 and may be responsive to engine operating conditions, intake system conditions, exhaust system conditions, exhaust gas temperature, or fuel concentration. The remaining exhaust gas may pass through and drive turbine 34 of the turbocharger.

Turbine 34, driven by the exhaust gas, may power compressor 32. Exhaust gas may then flow into the atmosphere via an exhaust gas after-treatment device 42. The turbocharger, which may include turbine 34 and compressor 32, may be embodied as a twin turbocharger, a scroll turbocharger, or a variable geometry turbocharger.

The engine system 10 also includes an oxygen delivery apparatus in the form of a reformer device 50. The device 50 may generate oxygen and deliver it to the cylinder 12 via a conduit 56 in response to actuation of the accelerator. The reformer device 50 may include a reservoir for storing oxygen. The oxygen may be stored at a pressure greater than the turbo boost pressure. Control system 80 may control the operation of the reformer device 50 and the EGR system 41 via actuators 84. A control valve 54 for controlling the amount of oxygen delivered to the cylinder 12 and a control valve 47 for controlling the amount of exhaust gas that is recirculated to the intake manifold 16 may be communicatively coupled to control system 80. In response to depression of the accelerator pedal 62, the control system 80 may actuate valve 47 so as to ramp down the recirculation of exhaust gas. The control system 80 may also actuate a valve 54 to deliver oxygen to the cylinder 12.

In some embodiments, the reformer device may be a steam reformer that, through endothermic conversion, allows fuel within aircharge or exhaust gas to interact with a catalyst. At high temperatures, this interaction may form oxygen gas as well as other bi-products such as carbon monoxide and/or hydrogen gas. The oxygen gas and additional bi-products of fuel reformation may then be delivered to the cylinder 12.

The reformer device may be powered by electrical energy that may be provided, for example, by the crankshaft, an electric motor, or translated from frictional energy stored from vehicle deceleration. The engine system may be provided within a hybrid vehicle and the hydrogen delivery apparatus may be powered by electrical energy generated during deceleration of the vehicle.

The flow of oxygen into the cylinders from the reformer device may be metered by valve 54 which may be actuated via a control system in response to engine operating conditions including engine load, PP signal, EGR concentration in engine intake, or oxygen concentration in EGR. A number of sensors within the engine system may be used to determine the engine operating conditions such as a PP sensor, a MAF sensor, or a humidity sensor. Oxygen delivered to the engine system may increase if it is sensed that an accelerator device has been significantly depressed or actuated beyond a threshold.

The reformer device 50 may also be adapted to generate hydrogen that may be delivered to the exhaust manifold 24 via a conduit 52. The hydrogen may therefore be delivered to the exhaust gas system 20 upstream of the turbine 34. At this location, the exhaust gas is relatively oxygen rich. However, it should be noted, the reformer device 50 could deliver at least a portion of the generated oxygen to the exhaust manifold 24. Also, the temperature of the exhaust gas at this location is typically above the autoignition temperature of the hydrogen.

Turbine 34, driven by the exhaust gas, may power compressor 32. Exhaust gas may then flow into the atmosphere via an exhaust gas after-treatment device 42. The turbocharger, which may include turbine 34 and compressor 32, may be embodied as a twin turbocharger, a scroll turbocharger, or a variable geometry turbocharger.

Twin turbocharger embodiments may include two turbochargers, each with an individual compressor and turbine. The respective turbochargers may operate in series or parallel and may be communicatively coupled via control system 80. Twin turbines arranged in parallel may each be fluidically coupled to separate cylinders so that they each receive a portion of exhaust gas from combustion. Alternately, they may be coupled to a single exhaust manifold that branches into dual paths upstream of the turbines such that each path is respectively coupled to the individual turbines. Series configurations may be operated by a controller with instructions to run a first turbocharger at low engine speeds and/or loads and to run a second turbocharger at high speeds and/or loads. The high speed/load turbocharger may be activated in response to surpassing a certain engine load or vehicle speed threshold.

This arrangement may help to reduce turbo lag by implementing two smaller turbochargers each more responsive to throttle position than a large turbocharger. However, two turbochargers use more undercarriage space and add more weight to the vehicle than a single turbocharger with the equivalent boost capabilities. Further, controlling two turbochargers is difficult and is not consistent overall operating conditions, resulting in less predictable engine response to acceleration and decreased driving comfort.

In other embodiments, twin-scroll turbochargers may separate exhaust gas from cylinders whose strokes mutually interfere with the expulsion of exhaust gas. Exhaust gas from interfering cylinders may be coupled to separate exhaust paths each with a nozzle disposed on the turbine. A first exhaust inlet and nozzle may have a passageway with a more restricted cross sectional area than that of a second exhaust inlet and nozzle. By restricting the flow cross-section, the velocity of flow may be increased for decreased turbo lag. The second inlet and nozzle may be configured for peak performance.

A variable-geometry turbocharger may restrict the passage of the exhaust path upstream of the turbine with a number of obstructions actuated to achieve a desired flow velocity to the turbine for the given operating conditions. The obstructions may be actuated to achieve a flow cross section by actuators communicatively coupled to control system 80 responsive to an engine load, speed, or PP.

Though each of these systems helps to reduce turbo lag, they do not eliminate it. Further, each required additional control method decreases drivability. Additional mechanical components may degrade, add additional weight to the vehicle, and expend limited under-hood space.

Thus, engine system 10 may include a hydrogen delivery apparatus which may be used with the turbocharger systems. Fuel from aircharge, exhaust, or both may be delivered to a hydrogen reformer device 90 for hydrogen generation. The reformer device may be coupled to exhaust manifold 24 via a hydrogen conduit 92 upstream of turbine 34. Hydrogen may be injected into the exhaust system at a point where the internal temperature within the system is at or above the autoignition temperature of hydrogen such that, upon entering the exhaust system, hydrogen may combust.

Hydrogen flow into the exhaust system may be metered by a hydrogen valve 94. Valve 94 may be within the hydrogen delivery apparatus upstream or downstream of the hydrogen reformer device 90. Exhaust gas may be relatively oxygen rich in the portion of the exhaust system upstream of the turbine, aiding in the ignition and power of hydrogen combustion. The reformer device 90 may be the same device as the oxygen generating device such as reformer 50. In other embodiment oxygen reformer 50 and hydrogen reformer 90 may be contained within a single delivery apparatus.

In some embodiments, the hydrogen reformer device 90 may be a steam reformer that, through endothermic conversion, allows fuel within aircharge or exhaust gas to interact with a catalyst. At high temperatures this interaction may form hydrogen gas as well as other bi-products such as carbon monoxide and/or oxygen gas. The hydrogen gas and additional bi-products of fuel reformation may then be delivered to the exhaust system upstream of turbine 34. The temperature of the exhaust gas at this location is typically above the autoignition temperature of the hydrogen.

The reformer device 90 may be powered by electrical energy that may be provided, for example, by the crankshaft, an electric motor, or translated from frictional energy stored from vehicle deceleration. The engine system may be provided within a hybrid vehicle and the hydrogen delivery apparatus may be powered by electrical energy generated during deceleration of the vehicle.

As a consequence of hydrogen combustion, the exhaust gas upstream of the turbine may rapidly expand creating increased pressure within the exhaust system. Exhaust gas may thus pass through turbine 34 with increased speed and kinetic energy. This increased speed and energy increases the speed of turbine operation, consequently decreasing turbo lag.

During boost conditions, the power delivered to the compressor from the turbine is proportionally increased. Thus, in some embodiments, hydrogen delivery may be initiated during boost. Hydrogen delivery may be metered by a valve 94 within the hydrogen delivery apparatus upstream of the reformer and downstream of the fuel intake and may be actuated by a control system 80.

The delivered hydrogen gas may therefore combust and expand. This may occur as the gas is passing through the turbine 34 which causes an increase in the speed of the turbine 34. Consequently, the compressor 32 may be driven faster, causing an increase in the air that is delivered to the engine, reducing turbo lag.

The engine system 10 may include control system that also controls the delivery of hydrogen. The control system may include a control valve 54 for selectively allowing hydrogen to be delivered to the exhaust manifold 24. The control system may deliver hydrogen to the exhaust manifold 24 in response to operation of the accelerator device. Therefore, the hydrogen may be used to induce more air towards the engine during an acceleration event. Acceleration may be communicated to the control system via an acceleration pedal sensor.

The engine system 10 may include a sensor adapted to measure the speed of the turbocharger and be communicatively coupled to the hydrogen delivery apparatus. Any suitable sensor may be used to determine turbocharger speed, including a MAF sensor upstream of the turbine or downstream of the compressor. The hydrogen delivery apparatus may deliver hydrogen, or increase the delivery of hydrogen, to the exhaust gas system dependent on the turbocharger speed. The reformer device may provide oxygen to the oxygen delivery apparatus.

In other embodiments, the control system may have instructions to deliver hydrogen to the exhaust manifold 24 when the turbocharger speed is low and therefore the engine speed is at or near idle speed.

Hydrogen delivery may also be metered by a valve downstream of the reformer device within conduit 92. In other embodiments, hydrogen deliver may be metered by metering the power provided to the reformer device for hydrogen generation. The reformer may be coupled and decoupled to a power source via the control system in response to certain engine events. Hydrogen generation may also be metered by the metering the delivery of steam to the reformer device. Steam may be provided by heating a liquid such as coolant or window washer fluid by exposing it to a heater such as an engine heat exchange device, radiator, or the engine itself. Steam may be coupled and decoupled from the reformer device via a valve actuated by the control system. The engine system 10 can be provided within a hybrid vehicle and the reformer device 50 can be powered by electrical energy generated during deceleration of the vehicle. This ensures that the compressor speed may be increased without contributing to an additional load on the engine.

FIG. 3A shows various engine parameters over time for an EGR equipped engine. The EGR flow rate may be limited to allow sufficient available oxygen 300 in the event 302 that the driver operates the accelerator pedal 62. In the figure, this event 302 occurs at time t1. In response to the event 302, the EGR valve 47 is closed so that the EGR flow rate reduces to zero as exhaust gas is purged from the intake manifold 16b, as shown at 308. The amount of oxygen actually used 304 within the engine closely matches, but slightly lags, the available oxygen 300. Following operation of the accelerator pedal 62, the torque generated 306 gradually builds to a maximum value.

FIG. 3B shows the same engine parameters over time for an embodiment that uses EGR and oxygen injection. For comparison, the conventional available oxygen 300, oxygen used 304 and torque generated 306 are also shown in dashed lines.

In some embodiments, the EGR flow rate may be configured to be greater than in the conventional case. In the event 302 that the driver operates the accelerator pedal 62, the EGR valve 47 may close so that the EGR flow rate ramps down. Also, the oxygen control valve 54 may open so that oxygen is delivered to the cylinder 12. The amount of oxygen available may therefore sharply increase after time t1. In response, the amount of oxygen used 304 also increases, at a rate which is significantly greater than for the conventional case. Consequently, the torque generated 306 builds to a maximum value at a substantially more rapid rate.

A sensor (not shown), such as an oxygen sensor, may be provided within the engine system. When it is sensed that the oxygen used 304 has leveled off at a value close to atmospheric levels of oxygen, the oxygen control valve 54 may close. In the figure, this occurs at time t2.

The embodiment depicted in FIG. 3C may have a hydrogen delivery apparatus and an oxygen delivery apparatus. After accelerator depression at t1, an amount of oxygen may be delivered to the cylinder 12 and hydrogen may be delivered to the exhaust system upstream of a turbine. An operating system may have instructions to delay spark timing to lower the efficiency of combustion so that the exhaust entering the exhaust system may retain an amount of unburned oxygen. The amount of hydrogen in the exhaust system is shown by line 310. The hydrogen delivery apparatus may deliver hydrogen at t1 to the exhaust system. Hydrogen within the exhaust system may combust consequently increasing the speed and energy of exhaust gas upstream of a turbine to decrease turbo lag. After combustion the amount of hydrogen gas within the exhaust system may decrease as hydrogen oxidizes. A valve controlling the delivery of hydrogen via a control system may shut at a time after t1 or after the delivery of an initial amount of hydrogen.

An example operating routine for an embodiment including a hydrogen delivery apparatus and an oxygen deliver apparatus is shown in FIG. 4. At 402 the control system may determine via sensor and/or PP signal if the accelerator pedal is substantially depressed. If it is not substantially depressed the system may return to 400 at 412. If substantial acceleration is indicated via a substantially depressed accelerator, the amount of oxygen delivered to the cylinders via the oxygen delivery apparatus may be increased at 404. At 406 the amount of EGR delivered to the intake may be decreased. Some embodiments may increase oxygen whilst leaving EGR delivery to the intake constant. Other embodiments may decrease EGR delivery whilst leaving oxygen delivery constant.

In embodiments equipped with an optional hydrogen delivery apparatus either within or separate from the oxygen delivery apparatus, the amount of hydrogen delivered to an exhaust system may increase at 408. This may be done for subsequent combustion and expansion of hydrogen gas in the exhaust system upstream of a turbine to reduce turbo lag. Other embodiments may not include a turbocharger or a hydrogen delivery apparatus. Further embodiments may produce hydrogen and oxygen within the same apparatus and/or same reformer device.

At 410, it may be determined if an amount of EGR to the intake system has fallen below a threshold. If it has not the method may return to 404. If it has fallen below a threshold the method may return to start at 412.

Note that the example control and estimation routines included herein can be used with various engine and/or vehicle system configurations. Further, this technology can be applied to any type of powertrain including, but not limited to, powertrains associated with pure electric, hybrid electric, plug-in hybrid electric, fuel cell electric, and diesel engine powered vehicles. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

The operating conditions of an embodiment operating in a first mode are depicted in FIG. 5 as a function of time. The operating conditions may be for a diesel engine embodiment that operates on a lean fuel mixture as shown by line 500. After accelerator pedal depression, the amount of fuel 504 injected into the cylinders may increase to achieve increased torque. An amount of oxygen 502 within the engine cylinders may be low prior to accelerator depression resulting from an amount of EGR within the intake system. The amount of EGR within the intake system is shown by line 506. An EGR valve may close in response to accelerator depression. An oxygen delivery apparatus may deliver oxygen to the cylinders. The amount of fuel injected in to each cylinder for combustion may increase to achieve increased torque thus the AFR may remain approximately constant or decrease slowly with time. After the amount of EGR in the intake has fallen below a threshold the injection of oxygen into the cylinder 12 may terminate. In other embodiments, a predetermined amount of oxygen may be delivered to the intake system and may not be responsive to the amount of EGR in the intake system. The torque produced by the engine may be indicated by line 508. Oxygen within the engine may allow the increased amount of fuel injected in the cylinders to burn with higher efficiency contributing to increased torque production. In embodiments without an oxygen delivery apparatus, the amount of fuel burned during combustion may be limited by the presiding amount of oxygen in the chambers. Thus, despite an increase of fuel injected into the engine, torque may increase much more slowly until EGR is exhausted from the intake and a sufficient oxygen content for combustion restored. Thus, the embodiment using an oxygen delivery apparatus achieves maximum torque in a shorter length of time.

The conditions depicted in FIG. 5 may be induced by actuators responsive to a control routine such as that in FIG. 6. Upon accelerator depression at 552, it may be determined if exhaust gas from EGR is present within the engine intake at 554. Otherwise the system returns to 500 at 566. If exhaust gas is present, the oxygen content within the intake for impending combustions may be determined. The determination may be based on the current amount of exhaust gas being recirculated into the intake system or the EGR level at 552. The EGR level may be determined by an oxygen sensor or a degree of EGR valve actuation. The EGR level determination may also be responsive to a pressure sensor within the EGR system or MAP. If the EGR level is above a threshold it may indicate that an insufficient amount of oxygen is present within the intake for combustion to achieve an amount of acceleration. If the EGR level is above an EGR maximum threshold for the presiding engine conditions at 552 the EGR valve may be closed at 556. The maximum EGR threshold may be determined by the control system and may be specific to current engine operation or vehicle speed.

After the EGR valve is closed, or of EGR maximum threshold is not exceeded, it may be determined if the amount of EGR within the intake is below an operating threshold at 558. The operating threshold may correspond to the maximum amount of EGR and the corresponding minimum amount of oxygen within the intake able to support the torque demands to achieve acceleration. If the amount of O2 within the intake is not below the operating threshold, an amount of oxygen may be delivered to the engine intake or engine cylinders via an oxygen delivery apparatus at 560. Delivery may be induced by the actuation of one or more oxygen delivery valves that may be located upstream or downstream of a reformer and may couple the oxygen delivery apparatus to the intake.

If the O2 level has then risen above the operating threshold, an EGR level may be determined that is able to sustain the new torque demand. The EGR valve may then open to a corresponding position at 562 that may be determined by the control system to achieve the new EGR level.

FIG. 7 shows the operating conditions for an embodiment in a second mode that includes an oxygen delivery apparatus and a hydrogen delivery apparatus. A fuel injector may be communicatively coupled to an accelerator device via a control system. Fuel injection may be increased in response to accelerator device actuation and the AFR 600 may approach stoichiometry. If an amount of EGR in the intake is above a threshold or an amount of oxygen 602 in the intake is below a threshold, oxygen may be delivered to the cylinder via an oxygen delivery apparatus. If the system is turbocharged, an amount of hydrogen 604 may be injected into the exhaust system that may be above an auto-ignition temperature for hydrogen. As indicated by line 606, the torque may increase in response to increased amount of fuel combustion.

Hydrogen may be delivered to the exhaust system when a sensor indicates an amount of oxygen is available within the exhaust system for combustion with an amount of hydrogen. Other embodiments may deliver hydrogen to the exhaust system directly responsive to accelerator actuation. Hydrogen may combust at the time indicated in the figure consequently increasing turbo speed 608, power delivered to the compressor, and turbocharger efficiency. Thus the turbo boost provided by the compressor may be delivered to the engine further increasing engine torque.

The operating conditions of FIG. 7 may result from the control routine of FIG. 8. The control routine may be performed by a control system communicatively coupled to a hydrogen delivery apparatus and an oxygen delivery apparatus. Increased torque may be achieved by increasing the amount of fuel to the cylinders and thus decreasing the AFR. It may also be achieved by turbo boost provided by the turbo charger. When the amount of fuel for combustion is increased, the amount of oxygen expended similarly increases, thus the amount of oxygen within the exhaust decreases. In systems using a hydrogen delivery apparatus, turbo lag is decreased by the combustion of hydrogen within the exhaust system, and is thus limited by the amount of oxygen within the exhaust. Thus in systems that include both a hydrogen delivery apparatus and an oxygen delivery apparatus, a lower AFR to receive heightened torque may be balanced with the amount of oxygen available within the exhaust for hydrogen combustion and resulting turbo boost.

The control routine of FIG. 7 may weight lowering AFR more heavily than achieving turbo boost. If an accelerator pedal is depressed at 652, the control system may begin a routine to lower AFR at 654. Otherwise, the system returns at 666 to 650. The routine may include increasing an amount of fuel injected into engine cylinders for combustion. In a diesel engine, the air charge for combustion may be lean and below the stoichiometric operation level. If the AFR level reaches a threshold value that may correspond to engine operation at or near stoichiometry at 658, O2 delivery from an oxygen delivery apparatus may be increased or initiated at 660. If the AFR has not reached a stoichiometric threshold at 658, fuel injection may again be increased at 656.

A sensor may measure an amount of oxygen within the exhaust system, it may be determined if the amount of oxygen within the exhaust has surpassed a threshold at 662. This threshold may correspond to the amount of oxygen within the exhaust system able to support an amount of hydrogen combustion. If an insufficient amount of oxygen is within the exhaust system, oxygen delivery may increase at 660 until the threshold at 662 is met. When the oxygen level within the exhaust system is above the threshold, an amount of hydrogen may be delivered to the exhaust from a hydrogen delivery apparatus at 664. The hydrogen may then combust, providing energy to the turbine of a turbocharger. The turbine may then deliver this energy to a compressor to compress intake air delivered to the cylinders for turbo boost.

In a third mode shown in FIG. 9, the amount of oxygen 702 delivered to the cylinders for combustion may initially increase after accelerator actuation. Here the AFR 700 may not abruptly decrease to achieve acceleration resulting from the increased volume of oxygen delivered to the cylinders. The torque shown by line 606 may remain low so that it is below the value for the second mode of operation for a period of time following accelerator actuation. Ignition timing may also be retarded so as to preserve unspent oxygen concentration within the exhaust.

A hydrogen delivery apparatus may couple hydrogen to the exhaust system. Hydrogen 704 delivered to the exhaust system upstream of a turbine may combust and interact with oxygen increasing the energy delivered to the turbine to achieve turbo boost. Hydrogen combustion may occur in response to the oxygen content within the exhaust system exceeding a threshold.

Hydrogen may also be delivered into the system continuously over a period of time and auto-ignite. After the combustion of hydrogen, the hydrogen delivery apparatus may be decoupled from the exhaust system. The energy from hydrogen combustion may be captured by the turbine and delivered to the compressor for turbo boost. Turbine speed 708 may increase abruptly in response to the combustion of hydrogen gas.

After combustion, the oxygen delivery apparatus may be decoupled from the exhaust system and air for combustion may be fully or partially atmospheric. In other embodiments, oxygen into the cylinders may continue and be responsive to an amount of EGR in the cylinders. The AFR may be maintained at or above a predetermined threshold prior to the combustion of hydrogen. AFR may be kept lean so that an amount of oxygen is available in the exhaust system for hydrogen combustion. After hydrogen combustion, a control system may actuate a fuel injector and/or throttle so as to decrease the AFR, further increasing torque.

As shown in FIG. 6, the turbo speed and torque may remain below that of the system operating in the second mode for a period of time. This may be a result of the comparatively lower energy lean AFR combustions of the third mode; however, an oxygen content threshold for hydrogen combustion may be achieved in less time. Thus maximum engine torque may be achieved more quickly in the third embodiment due to reduced turbo lag.

The conditions of FIG. 9 may be induced by the control routine of FIG. 10. If an accelerator pedal is depressed at 752, it may be determined if the amount of oxygen within the exhaust system is above a threshold at 754. If the threshold is not met at 754 an amount of oxygen delivered to the engine cylinders via an oxygen delivery apparatus may increase at 756 until the threshold is met. The threshold may correspond to an amount of oxygen available to achieve a desired amount of hydrogen combustion.

After an oxygen threshold has been achieved, hydrogen may be delivered to the exhaust system at a point where temperature is above the auto-ignition temperature of hydrogen at 758. Hydrogen may then combust upstream of a turbine increasing turbine and thus turbocharger speed. The resulting turbo boost may be delivered to the engine, increasing engine torque.

If hydrogen combustion occurs at 760, the control system may begin a routine to decrease AFR at 762. This may include increasing the amount of fuel delivered to the engine for combustion at 764. At 764 it may be determined if the AFR is below a threshold that may correspond to stoichiometric engine operation. If the threshold is not at the threshold AFR may continue to decrease. Upon meeting the threshold at 764, the routine may repeat at 766 to 750.

In a fourth mode, a hydrogen system may operate independent of the oxygen delivery system. An embodiment of this mode may have operating conditions over time such as those depicted in FIG. 11. Here, upon accelerator pedal depression, the AFR may decrease slightly to provide increased torque as represented by line 800. An AFR decrease may be small so as to provide a sufficient amount of oxygen to the exhaust system for hydrogen combustion, consequently the increase in fuel injection 804 may be similarly small. Hydrogen may then be delivered to the exhaust system via a hydrogen delivery apparatus as indicated by line 802. The hydrogen may then combust within the exhaust system and become oxidized, reducing the hydrogen gas content in the exhaust as indicated. Prior to hydrogen combustion the turbine, and thus turbo, speed 806 may increase slightly between accelerator pedal actuation and hydrogen combustion. This may result from the increase in manifold pressure from the delivery of hydrogen as well as the slight increase in AFR. Engine torque may experience a similar increase. After hydrogen combustion, turbocharger speed may increase sharply due to the increased energy provided to the turbine. The resulting turbo boost may then provide increased engine torque as shown by line 808.

A control routine such as that in FIG. 12 may induce the conditions of FIG. 11. After accelerator pedal depression at 852, hydrogen may be delivered to the exhaust system via a hydrogen delivery apparatus at 860. After the hydrogen combusts at 862 within the exhaust system upstream of a turbine, it may be determined if the turbocharger speed is above a threshold value. If it is not above a threshold hydrogen may again be delivered to the exhaust system. After turbo speed has surpassed a threshold at 864, the AFR may then be reduced at 854. This may include increasing the amount of fuel injected into the cylinders for combustion at 856. The AFR may approach a stoichiometric threshold. If it is determined at 858 that the amount of engine torque produced is above a threshold, the routine may repeat at 866 to 850. If it has not reached a threshold, AFR may be further decreased at 856 and fuel injection subsequently increased at 856.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An engine system comprising:
an accelerator device;
an exhaust gas recirculation system with an inlet coupled to an exhaust system and an outlet coupled to an intake system; and
an oxygen delivery apparatus with an inlet and an outlet, the outlet coupled to one or more engine cylinders within an engine;
a hydrogen delivery apparatus with an outlet coupled to the exhaust system at a location in which a temperature of exhaust gas is at or above an autoignition temperature of hydrogen; and
a control system with instructions to control operation of the oxygen delivery apparatus and the hydrogen delivery apparatus in response to operating conditions and actuation of the accelerator device, wherein the control system includes instructions to reduce or terminate recirculation of exhaust gas to the engine in response to actuation of the accelerator device in a direction that will further open a throttle.

2. The engine system of claim 1, wherein the oxygen delivery apparatus includes a reservoir for storing oxygen.

3. The engine system of claim 1, wherein the oxygen delivery apparatus stores oxygen at a pressure greater than a turbo boost pressure.

4. The engine system of claim 1, wherein the control system is communicatively coupled to an exhaust gas sensor within the engine and the oxygen delivery apparatus is actuated in response to an amount of EGR within the intake system, an amount of oxygen within the exhaust system, an amount of hydrogen within the exhaust system, air-fuel ratio, or turbocharger speed.

5. The engine system of claim 4, wherein the control system is communicatively coupled to an oxygen sensor within the engine.

6. The engine system of claim 5, wherein the control system has instructions to deliver oxygen to the engine in response to actuation of the accelerator device so as to cause an overboost condition within the engine.

7. The engine system of claim 1, wherein the oxygen delivery apparatus comprises a reformer device.

8. The engine system of claim 1, further comprising a turbocharger comprising a compressor mechanically coupled to a turbine, the turbine being driven by the removed exhaust gas, and the hydrogen delivery apparatus is configured to increase a speed of the turbine by combusting and expanding hydrogen in the exhaust system.

9. The engine system of claim 8, wherein the control system has instructions to initiate or increase a delivery of hydrogen to an engine in response to operation of the accelerator device, air-fuel ratio, oxygen content within the exhaust system, or operation of the oxygen delivery apparatus.

10. A method for an engine system, comprising:
recirculating a portion of engine exhaust gas to an engine intake;
delivering oxygen to an engine cylinder or the intake in response to actuation of an accelerator device operable to increase an amount of fuel delivered to the engine for combustion;
delivering hydrogen to an exhaust system upstream of a turbine of a turbocharger via a hydrogen delivery apparatus, and
reducing a recirculation of exhaust gas amount to the engine in response to actuation of the accelerator device in a direction that will further open a throttle.

11. The method of claim 10, further comprising storing oxygen at a pressure greater than a turbo boost pressure.

12. The method of claim 10, further comprising causing an overboost condition within the engine by delivering oxygen to the engine in response to actuation of the accelerator device.

13. The method of claim 10, further comprising sensing a level of exhaust gas in the engine and reducing or terminating a delivery of oxygen to the engine in response to the level of exhaust gas reaching a predetermined minimum value.

14. The method of claim 10, further comprising reducing a delivery of oxygen to the engine in response a level of oxygen in the intake reaching a predetermined maximum value.

15. The method of claim 10, further comprising increasing an amount of oxygen delivered to the engine in response to an amount of oxygen within the exhaust system being below a threshold.

16. The method of claim 10, further comprising increasing an amount of hydrogen delivered to the exhaust system in response to an air-fuel ratio falling below a threshold.

17. An engine system comprising:
an accelerator device which is operable to increase an amount of fuel delivered to an engine for combustion;
an exhaust gas recirculation system for removing exhaust gas from the engine and recirculating a portion of the exhaust gas to the engine;
a turbocharger comprising a compressor for inducing air towards the engine and a turbine for powering the compressor, the turbine being driven by removed exhaust gas;
an oxygen delivery apparatus adapted to deliver oxygen to the engine in response to operation of the accelerator device;
a hydrogen delivery apparatus adapted to deliver hydrogen to the removed exhaust gas to the engine in response to operation of the accelerator device, and
wherein the hydrogen delivery apparatus is responsive to an operation of the oxygen delivery apparatus and the oxygen delivery apparatus is responsive to an operation of the hydrogen delivery apparatus.

18. The system of claim 17, further comprising a control system with instructions to control operation of the oxygen delivery apparatus and the hydrogen delivery apparatus.

19. The system of claim 17, wherein the hydrogen delivery apparatus delivers hydrogen to the removed exhaust gas to the engine when an oxygen level in an exhaust system is above a threshold.

* * * * *